United States Patent
Van Zeeland

[19]

[11] Patent Number: 5,867,082
[45] Date of Patent: Feb. 2, 1999

[54] SWITCH WITH MAGNETICALLY-COUPLED ARMATURE

[75] Inventor: Anthony J. Van Zeeland, Mesa, Ariz.

[73] Assignee: DuraSwitch, Inc., Scottsdale, Ariz.

[21] Appl. No.: 924,334

[22] Filed: Sep. 5, 1997

Related U.S. Application Data

[63] Continuation-in-part of Ser. No. 646,083, May 7, 1996, Pat. No. 5,666,096, which is a continuation-in-part of Ser. No. 458,989, Jun. 2, 1995, Pat. No. 5,523,730.

[51] Int. Cl.⁶ ........................................ H01H 9/00
[52] U.S. Cl. ........................................ 335/205; 200/521
[58] Field of Search ................................ 335/205–207; 200/11 R, 12, 13, 14, 512, 519, 521, 525, 527

[56] References Cited

U.S. PATENT DOCUMENTS

| | | |
|---|---|---|
| 2,410,746 | 9/1946 | Raettig . |
| 3,735,300 | 5/1973 | Benner et al. . |
| 3,859,612 | 1/1975 | Kashio . |
| 3,879,602 | 4/1975 | Walker . |
| 4,068,202 | 1/1978 | Lyons, III . |
| 4,101,857 | 7/1978 | O'Toole . |
| 4,199,741 | 4/1980 | Serrus Paulet . |
| 4,203,013 | 5/1980 | Serras-Paulet . |
| 4,370,631 | 1/1983 | Gerber et al. . |
| 4,389,627 | 6/1983 | Uesugi et al. . |
| 4,400,594 | 8/1983 | Serras-Paulet . |
| 4,603,309 | 7/1986 | Renken . |
| 4,669,486 | 6/1987 | Shima ........................ 200/314 |
| 4,916,275 | 4/1990 | Almond ...................... 200/516 |
| 4,972,052 | 11/1990 | Hawranek .................. 200/11 R |
| 5,144,274 | 9/1992 | Masaki . |
| 5,268,660 | 12/1993 | Cappelli . |
| 5,313,027 | 5/1994 | Inoue et al. . |
| 5,332,992 | 7/1994 | Woods ........................ 335/205 |
| 5,365,155 | 11/1994 | Zimmermann . |
| 5,510,589 | 4/1996 | Arnai ........................... 200/522 |
| 5,523,730 | 6/1996 | Van Zeeland . |
| 5,666,096 | 9/1997 | Van Zeeland . |
| 5,717,176 | 2/1998 | Dahlstrom .................. 200/512 |

FOREIGN PATENT DOCUMENTS

| | | |
|---|---|---|
| 1.329.674 | 5/1963 | France . |
| 1144368 | 2/1959 | Germany . |
| 1055646 | 4/1959 | Germany . |
| 3408599 | 9/1985 | Germany . |
| 90 03 955 U | 7/1990 | Germany . |

*Primary Examiner*—Lincoln Donovan
*Attorney, Agent, or Firm*—Dorn, McEachran, Jambor & Keating

[57] ABSTRACT

A switch has a carrier sheet with electrodes formed on an internal side thereof to form switch contacts. An armature is held in slidable contact with the internal side of the carrier and the electrodes by a magnet disposed on the external surface of the carrier. The magnet is carried in a knob mounted on the external side of the membrane carrier for rotary, linear or complex motion. When a user manipulates the knob the magnet drags the armature either into or out of shorting relation with the electrodes. A magnetic detent gear can be incorporated to provide tactile feedback. A pushbutton version of the switch can be made with a pivotable armature normally held spaced from electrodes on the substrate by a magnet. A membrane and spacer may be added to protect and seal the electrodes and armature.

16 Claims, 11 Drawing Sheets

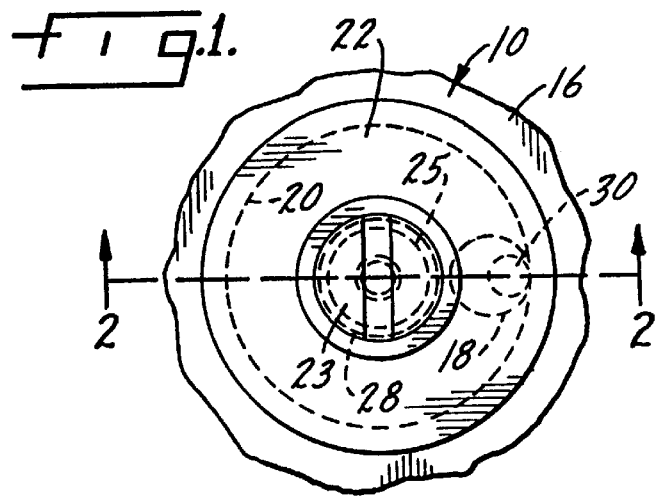
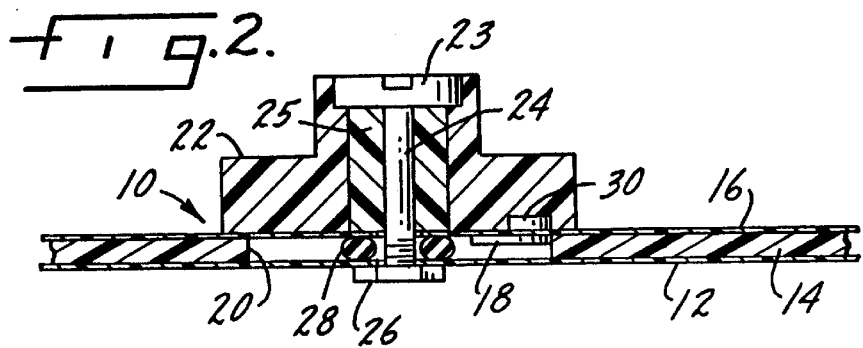
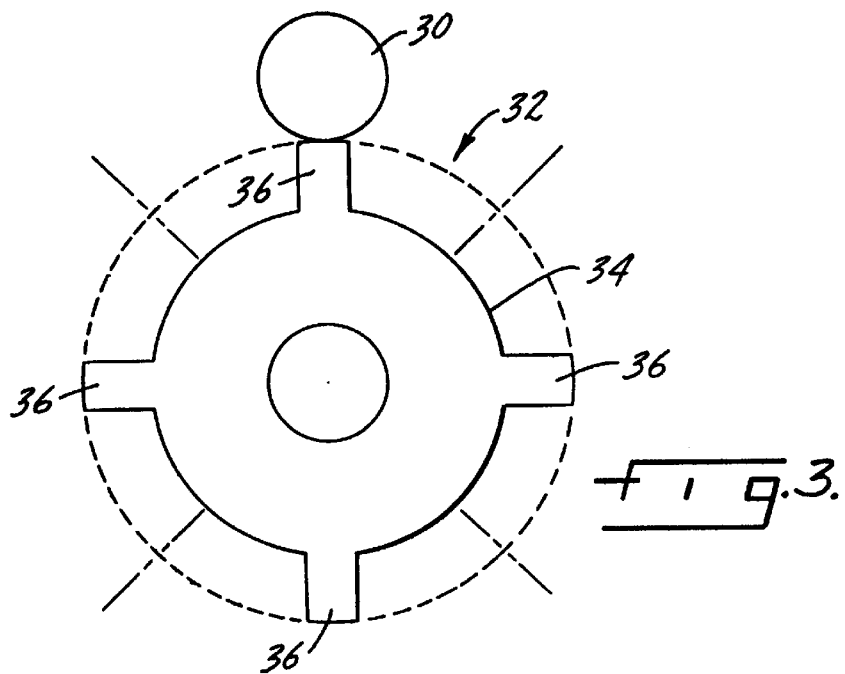

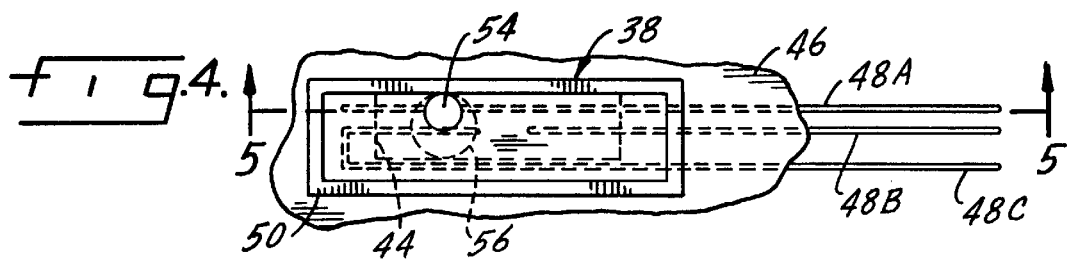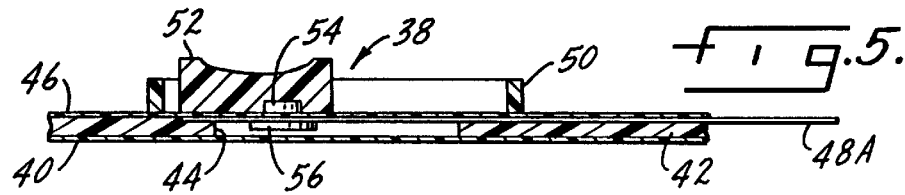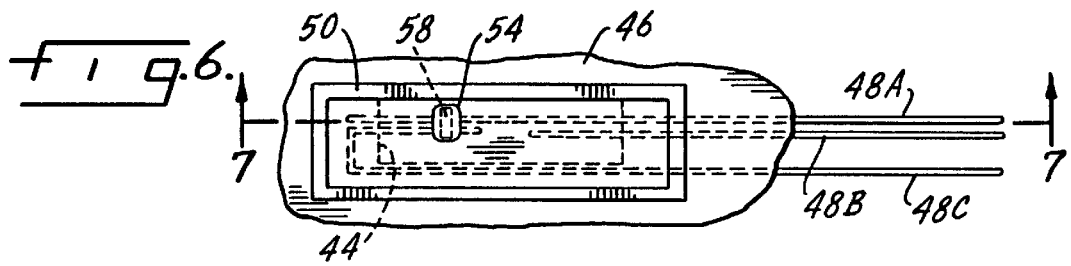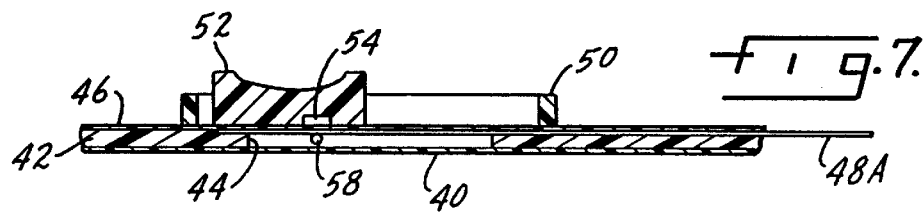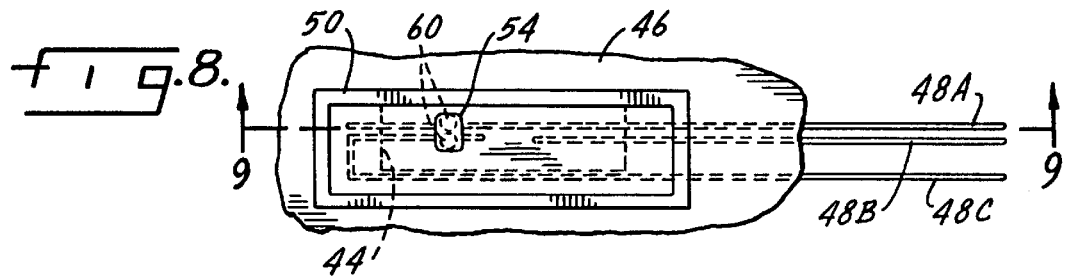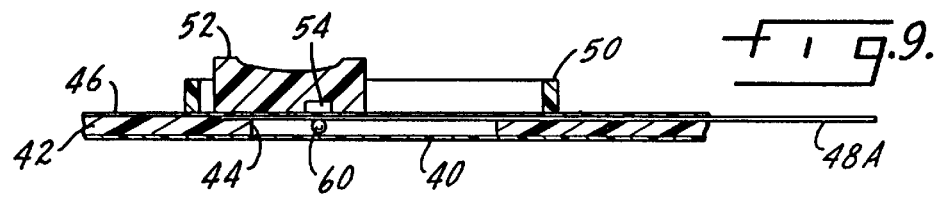

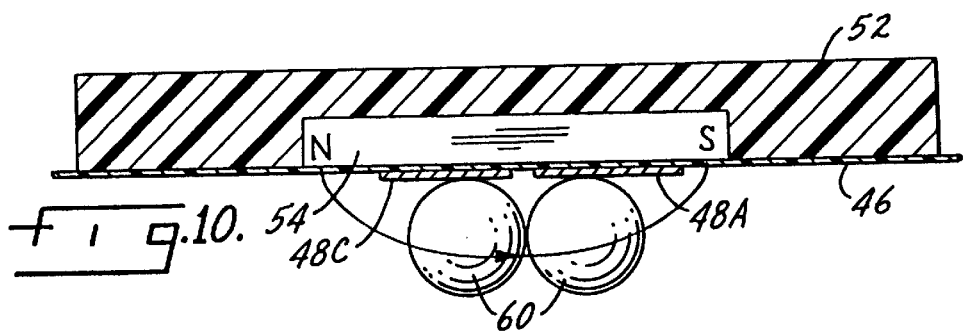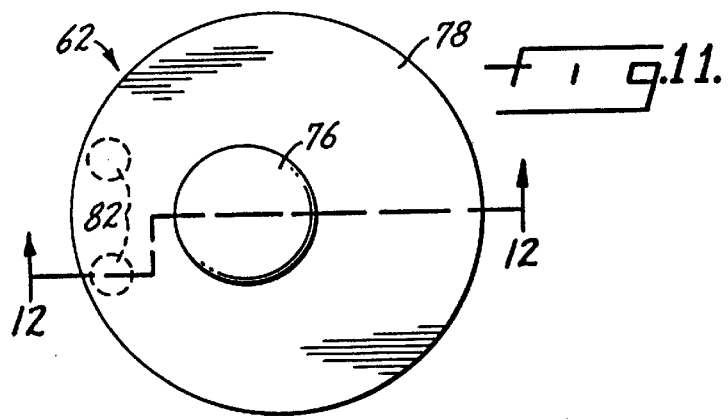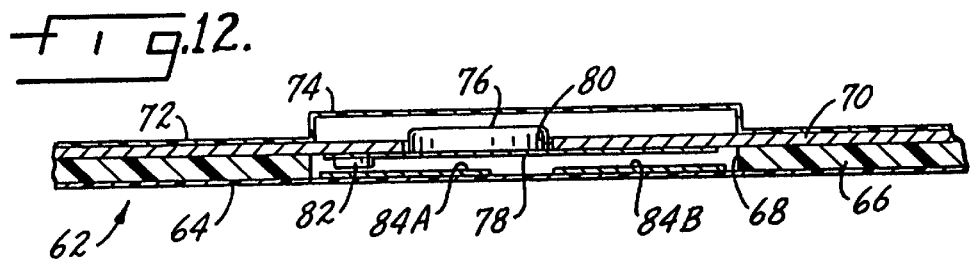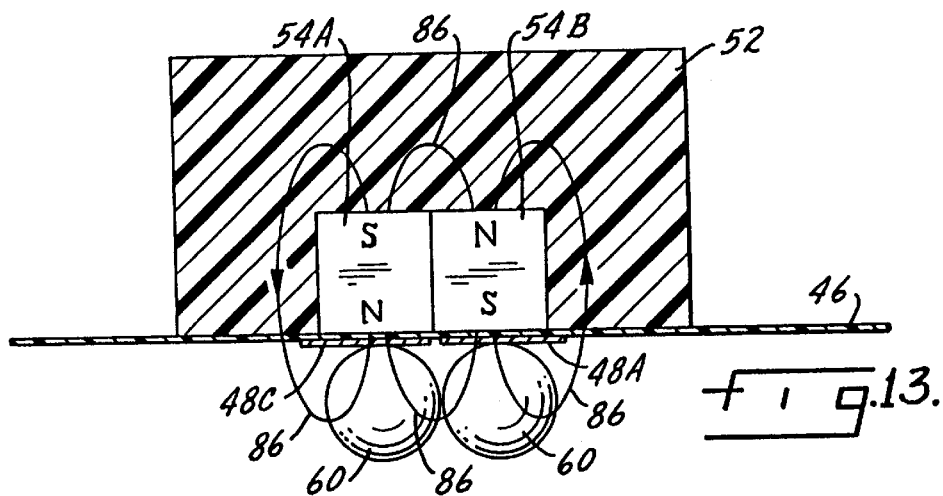

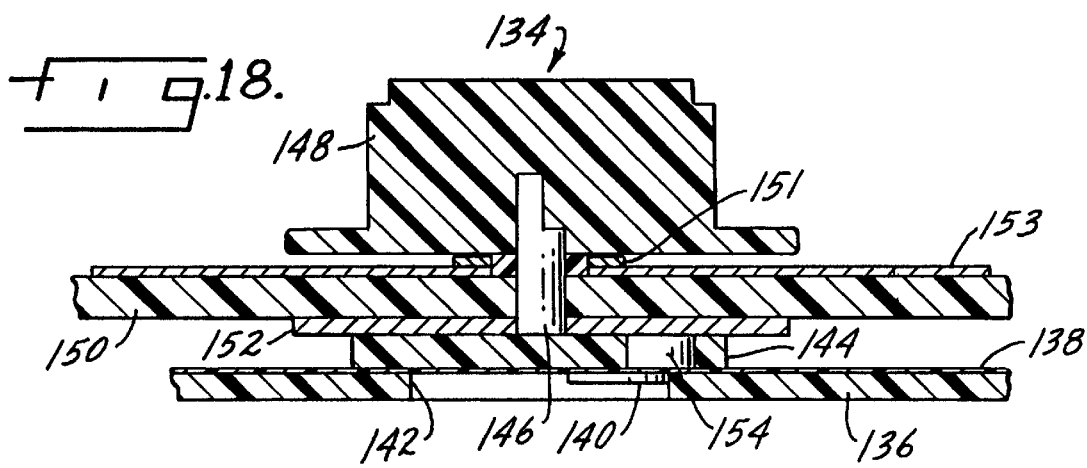
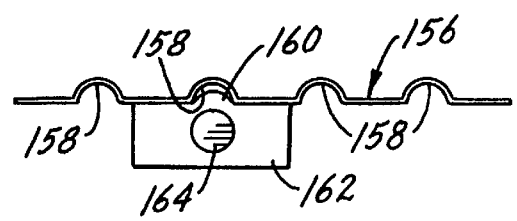

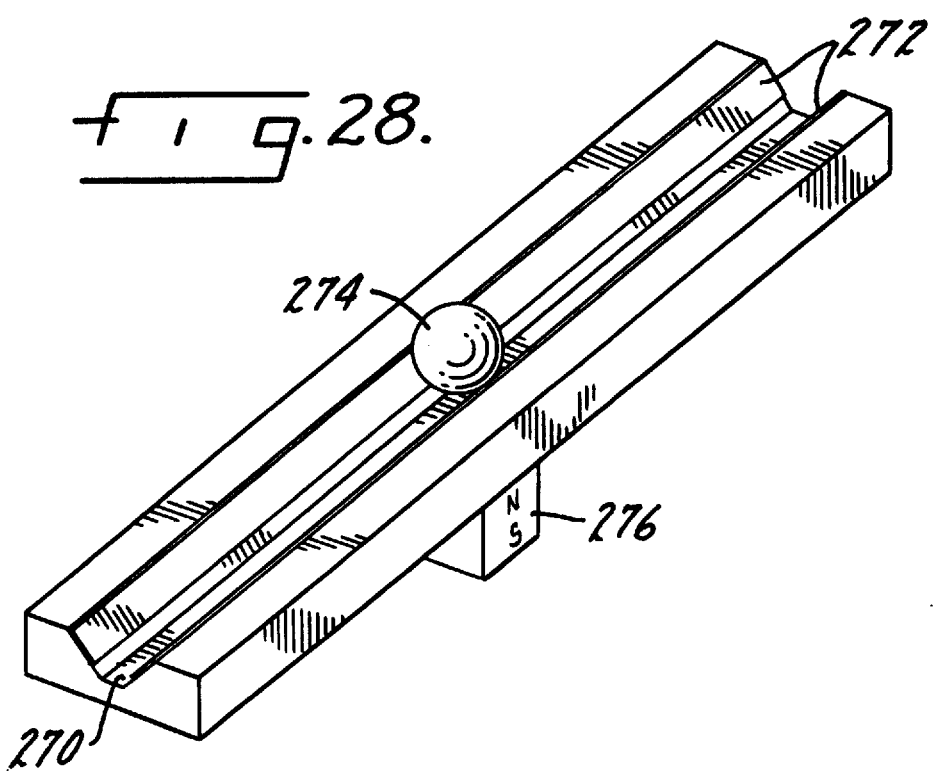

SWITCH WITH MAGNETICALLY-COUPLED ARMATURE

CROSS-REFERENCE TO RELATED APPLICATIONS

This application is a continuation-in-part of application Ser. No. 08/646,083, filed May 7, 1996, now U.S. Pat. No. 5,666,096, issued Sep. 9, 1997, which is a continuation-in-part of Ser. No. 08/458,989, filed Jun. 2, 1995, now U.S. Pat. No. 5,523,730, issued Jun. 4, 1996.

BACKGROUND OF THE INVENTION

Membrane switches are well known for providing electrical switching functions in a reliable, compact package. Membrane switches typically have a flexible plastic membrane layer normally separated from a substrate by a non-conductive spacer. Openings in the spacer permit a user to push the membrane through the spacer, bringing facing electrical contacts on the internal surfaces of the membrane and substrate into contact with one another, thereby closing a switch. The natural resilience of the membrane returns the membrane to its spaced position upon removal of the actuating force.

While this basic membrane switch construction has many advantages, it does not provide some features desirable in certain applications. . For example, in some instances switch users are so accustomed to manipulating a particular type of mechanical actuator that they become confused by and consequently resistant to a membrane switch. The membrane switch is often a flat panel with graphical elements indicating where to press but having no protruding actuating member. Although membrane switches provide perfectly adequate electrical switching, manufacturers have found that users expecting to find a rotary switch or a slide switch or a pushbutton switch for a certain function don't take kindly to having the familiar switch replaced with a flat panel membrane switch. This is especially true with consumer products. Also, in automotive applications it can be important to provide a rotary or slide switch that a driver can find and manipulate with one hand while not diverting his or her attention from the road.

Another ongoing problem in membrane switches has been providing feedback to a user of switch actuation. Since the membrane travel to closure is very small most users cannot tell when they have actuated a switch unless there is something to indicate to them that closure has occurred. Aural feedback is common but not always desirable. Tactile feedback has been provided by clicker domes built into the membrane. In full travel keyboards feedback has been provided by a plastic actuator mounted above the membrane switch panel. Such actuators are usually complicated little devices which makes them relatively expensive.

SUMMARY OF THE INVENTION

The present invention concerns incorporating rotary, pushbutton and slide switches or potentiometers into a flat panel switch. This combines the benefits of membrane switches with the look and feel users are accustomed to with traditional switches.

The rotary and slide switches have a knob mounted on a carrier sheet for rotary, linear or complex motion. The knob carries a magnet for movement therewith adjacent the external surface of the carrier. Electrodes including at least one pair of spaced switch contacts are formed on the underside of the carrier. An armature is made of electrically conductive and magnetic material. By magnetic material it is meant that the material is affected by a magnet. The magnet holds the armature up against the underside of the carrier and, accordingly, against the electrodes. Movement of the knob drags the armature into and out of shorting relation with the switch contacts. The armature can be a flat, disc-shaped element. Alternately, it can be cylindrical or spherical. Further alternate armature configurations include a flipper having two or more stable positions wherein different sets of contacts are shorted. A detent gear can be used to provide tactile feedback of movement into and out of switch closure. Preferably some sort of substrate, ball retainer or blister pack is used to protect and seal the electrodes and armature. A spacer with an opening in which the armature is disposed permits movement of the armature.

The rotary and slide switches of the present invention offer numerous advantages. The switches can be integrated into flat, continuous switch panels. Sealing integrity of the flat panels can be maintained since the switch contacts are located inside the switch. Seals rings can be readily employed to seal against dirt, dust and liquids. The knobs can be adhesively bonded to the front surface of a switch panel without the need to penetrate the continuously sealed surface. Off-center magnets can be employed to cause the armature to rotate during actuation thereby extending life. A virtually wear-proof magnetic detent can be added. A magnetic pre-load can be added in applications where the switch is subject to shock and vibration in use. Motor drives and magnetic clutches can be provided for applications such as washer timer controls. Integral membrane switch panels can be provided with pushbutton membrane switches, slide switches and rotary switches, or potentiometers, all integrated into one continuous panel. Low cost silver conductors can be used as switch contacts. Etched copper contacts can be provided for high current applications. Tactile feedback can be provided. The switches can be made as discrete, stand-alone components. High temperature membrane materials can be employed for high temperature applications, including high temperature processing such as wave soldering. Low cost polyester membranes can be employed as a carrier sheet or a printed circuit board could be used in place of a membrane or substrate.

The pushbutton switch has a layer of magnetic material between a spacer and a membrane. An armature in the spacer opening is pivotable between a normal position, in which it is spaced from electrodes on the substrate, and a closed position, in which it shorts the electrodes. The armature is held in its normal position by the magnetic attraction between the magnetic layer and the armature. When a user depresses the membrane the armature suddenly snaps free of the magnetic layer and closes against the electrodes, providing a switch closure and tactile feedback thereof. Removal of the closing pressure allows the magnetic layer to retract the armature and re-open the switch. A fulcrum built into one end of the armature assists the pivoting motion of the armature.

In an alternate pushbutton switch configuration, a rocking armature is disposed under a membrane in an opening of a spacer and on top of a substrate. Electrical contacts on the upper surface of the substrate are bridged by the armature which rocks back and forth in the nature of a seesaw. The armature has a central fulcrum engaging a common contact. The ends of the armature alternately make and break contact with outer contacts, as controlled by a user depressing the membrane. Magnets located beneath the surface of the substrate retain the armature in one position or the other.

A further alternate pushbutton switch configuration combines a pushbutton switch with one of a rotary switch, slide switch or potentiometer. In this arrangement a complete membrane switch is located underneath a flexible carrier sheet having the rotary or slide switch contacts thereon. The membrane switch comprises a membrane, spacer and substrate, with facing contacts on the inner surfaces of the membrane and substrate. A pushbutton extends through the knob of the rotary switch and actuates the underlying membrane switch.

BRIEF DESCRIPTION OF THE DRAWINGS

FIG. 1 is a plan view of the rotary switch according to the present invention.

FIG. 2 is a section taken along line 2—2 of FIG. 1.

FIG. 3 is a schematic plan view of one form of detent mechanism for a rotary switch.

FIG. 4 is a plan view of the slide switch according to the present invention with the actuator knob removed to show underlying parts.

FIG. 5 is a section taken along line 5—5 of FIG. 4.

FIG. 6 plan view of a slide switch having an alternate armature.

FIG. 7 is a section taken along line 7—7 of FIG. 6.

FIG. 8 plan view of a slide switch having a further alternate embodiment of an armature.

FIG. 9 is a section taken along line 9—9 of FIG. 8.

FIG. 10 is a greatly enlarged detail view of a switch having a spherical armature.

FIG. 11 is a plan view of a pushbutton switch according to the present invention.

FIG. 12 is a section taken along line 12—12 of FIG. 11.

FIG. 13 is a view similar to FIG. 10 showing an alternate arrangement of coupler magnets.

FIG. 18 is a section, similar to FIG. 2, of an alternate form of a rotary switch.

FIG. 19 is a schematic plan view, similar to FIG. 4, of an alternate form of detent mechanism.

FIG. 28 is a perspective view of a V-channel switch.

DETAILED DESCRIPTION OF THE INVENTION

Figure 14:
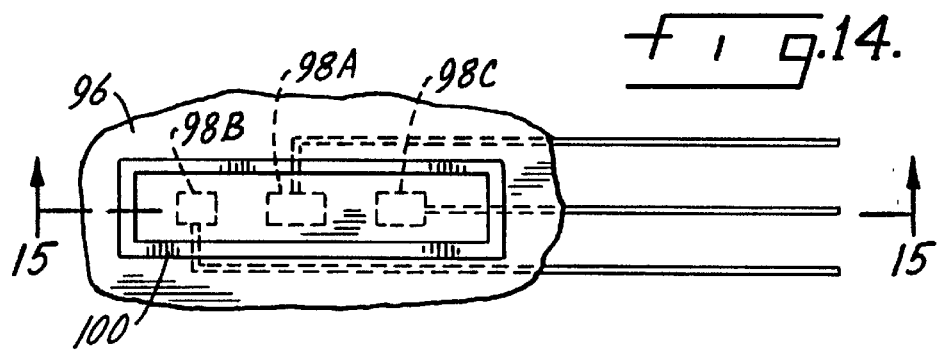
FIG. 14 is a plan view of an alternate slide switch according to the present invention with the actuator knob removed to show underlying parts.

FIGS. 1 and 2 illustrate a rotary switch according to the present invention. The switch shown generally at 10 includes a substrate layer 12, a non-conductive spacer 14 and a carrier in the form of a membrane layer 16. Although not shown, it will be understood that the internal surface of the membrane carries a set of electrodes which define the spaced contacts of at least one electrical switch. The electrodes are conventionally formed either by screen printing or etching in copper. These contacts are configured in such a manner as to allow at least two contacts to be shorted together by a metallic armature 18. The armature is made of an electrically conductive magnetic material. One example would be soft steel plated with silver. The silver is added to enhance electrical conductivity and resist oxidation. A harder material such as rhodium could be added to improve wear resistance. An opening 20 in the spacer receives the armature 18. In this embodiment the armature is a flat, circular disc.

An actuating knob 22 is mounted for rotation on the switch by a bolt. The bolt has a head 23 and a shaft 24 extending through the membrane, spacer opening and substrate. A sleeve 25 surrounds the shaft above the membrane. A nut 26 holds the bolt in place. A seal ring 28 prevents entry of dirt, dust or moisture into the spacer opening. The nut 26 is tightened on shaft 24 to compress the seal ring 28 and sleeve 25 slightly. The actuating knob has a central bore that is large enough to permit rotation of the knob on the sleeve. The bolt head 23 prevents the knob from coming off the switch. The nut is shown as a separate part but alternately its function could be served by a drilled and tapped enlarged portion of the substrate. In a further alternate construction the sleeve 25 could be adhesively bonded to the top of the membrane. In that case the nut would not be needed and the shaft of the bolt would stop short of the membrane.

The knob 22 carries a coupler 30 in its underside. The coupler is a magnet which may be molded or otherwise entrapped in the knob. Where magnetic interference with other electronic components is a concern, the coupler may be shielded as needed. The coupler 30 forces the armature 18 against the internal surface of the membrane by means of the magnetic field originating from the coupler. The coupler functions both to create the switch contact pressure as well as to drag the armature 18 from one contact to another when a user rotates the knob 22.

It will be understood that the knob could be either in or out of contact with the external surface of the membrane. Likewise the magnet may or may not contact the membrane's external surface. Contact, or lack or it, between the knob or magnet and the membrane is not critical so long as the magnet is close enough to the armature to maintain coupling of the magnet and armature, i.e., the armature always moves with the magnet.

Operation of the switch is as follows. When a user grasps and turns the knob 22 the coupler 30 rotates with the knob. By virtue of the magnetic coupling between the coupler 30 and the armature 18, the armature rotates with the knob. As it rotates the armature moves into shorting contact with the contacts on the membrane, thereby closing the switch. Further rotation will move the armature out of contact with one or both electrodes to open the switch. Obviously, more than one set of switch contacts may be placed under the rotational area of a single knob, providing a plurality of switches under one knob. For example, the space traversed by the armature as it rotates with the coupler defines a ring. Toward the inside diameter of that ring may be a circular common contact. Toward the outside diameter of the ring may be a plurality of exterior electrodes terminating at a point inside the ring but spaced from each other and the common contact. The armature is always in contact with the common contact but moves into and out of contact with the exterior contacts. Or the circular common contact could be a split ring or the like. Numerous variations are possible.

FIG. 3 illustrates a digital gear 32 which may optionally be incorporated in the rotary switch 10. The gear has a hub 34 with a plurality of cogs 36. Four cogs are shown but any number could be included as space permits, the dashed, diagonal lines in FIG. 3 indicating possible additional cog locations. The gear would be located on the external surface of the membrane 16, with the hub 34 surrounding the shaft 24 and the sleeve 25 sitting on top of the gear. The sleeve in this case would be shortened by the thickness of the gear 32. The underside of the knob 22 would also be cut out to accommodate the gear. The gear does not rotate with the knob but instead remains in a fixed position since it is compressed between the sleeve 25 and membrane 16. The cogs extend to the inside diameter of the circle described by the rotation of the coupler 30. The gear is made of magnetic material so that as the knob rotates the coupler into alignment with a cog the magnetic attraction between the coupler and cog creates a tactile sensation to the user. Alternately, a second magnet carried by the knob could be used in cooperation with the digital gear to provide tactile feedback.

FIGS. 4 and 5 illustrate a slide switch 38. It has a substrate 40, a spacer 42 with an opening 44, and a carrier in the form of a membrane 46, all similar to the rotary switch 10. The opening 44 is an elongated rectangle. The internal surface of the carrier or membrane 46 has electrodes or traces 48A, 48B and 48C formed thereon. Electrode 48A is a common electrode while the ends of 48B and 48C are spaced apart as shown. It will be understood that this electrode arrangement is for purposes of illustration only and many variations are possible.

A plastic housing 50 is mounted on the external surface of the membrane. The housing is generally a rectangular box with an elongated slot in the top which receives an actuator or knob 52. The actuator carries a coupler 54 which, in a preferred embodiment, is a magnet. An armature 56 is disposed in the opening 44. The armature may have the same disc-shape as in the rotary switch. Operation of the switch is similar to that of the rotary switch except the motion of the actuator 52 is linear instead of circular. The actuator carries the coupler 54 back and forth. Magnetic attraction between the coupler and armature causes the armature to move in conjunction with the coupler, connecting either trace 48B or 48C to trace 48A.

The slide switch could also have a digital gear for providing a detent as in the rotary switch. Also, it will be noted that in both the slide switch and the rotary switch the coupler magnet is placed off center relative to the armature. This is done intentionally to cause the armature to rotate as the actuator or knob is moved. This extends the life of the switch. While the offset coupler magnet is preferred, it is not necessary to arrange the magnet this way.

The electrodes shown in the first two embodiments define a switch. They could also be arranged to form a potentiometer. A potentiometer can be constructed by replacing the switch contacts with a resistor element to form either a rotary or slide potentiometer.

FIGS. 6 and 7 illustrate an alternate embodiment of the slide switch. This embodiment is similar to switch 38 except for the armature. A cylindrical armature 58 is substituted for the flat, disc-shaped armature. The cylindrical armature exhibits no hysteresis, i.e., when the direction of the actuator is reversed, the armature 58 tracks directly with no hesitation. The cylindrical armature also minimizes friction between the armature and the conductive traces.

FIGS. 8–10 illustrate a further alternate embodiment of an armature. Here the armature is a pair of conductive balls 60. The balls have all the advantages of the cylindrical armature of FIGS. 6 and 7 plus the following. When the direction of the actuating mechanism is complex, i.e., any path other than straight or circular, the ball armature will track without either sliding or binding. This will allow for a complex actuating pattern such as the shifting pattern of a five-speed transmission. Accordingly, the ball armature configuration could be used in a rotary switch, a slide switch or something having a more complex actuating movement.

FIG. 10 also illustrates that in its simplest form, the switch of the present invention requires only a carrier with electrodes, a coupler and an armature. A spacer and substrate, while probably desirable in most applications to protect the armature and electrodes, are not absolutely necessary. Also, while the carrier is shown as the flexible polyester membrane of a traditional membrane switch, it could be otherwise. For example, a printed circuit board could serve as a carrier. Indeed, the carrier need not be a thin, planar sheet. Although this may be the most practical configuration for many applications, any carrier arrangement that transmits enough of the magnetic field so that the armature always tracks with the coupler will suffice.

FIG. 13 illustrates a variation of the switch having a twin-ball armature. In this embodiment there are two coupler magnets 54A, 54B with oppositely arranged poles as shown. Thus, the magnet poles are directly above the balls. While two magnets are shown in the figure, these could be replaced by a single horseshoe magnet or a properly polarized bar magnet. In any case, the result is that the major force component of the magnetic field, illustrated by field lines 86, directs the balls up against the switch contacts. This creates a higher contact force and reduces the tendency of the balls to float along a line drawn between the ball centers. Another possible variant of the ball armature is to add more balls, perhaps of different sizes, to achieve a multiple contact configuration.

Figure 15:
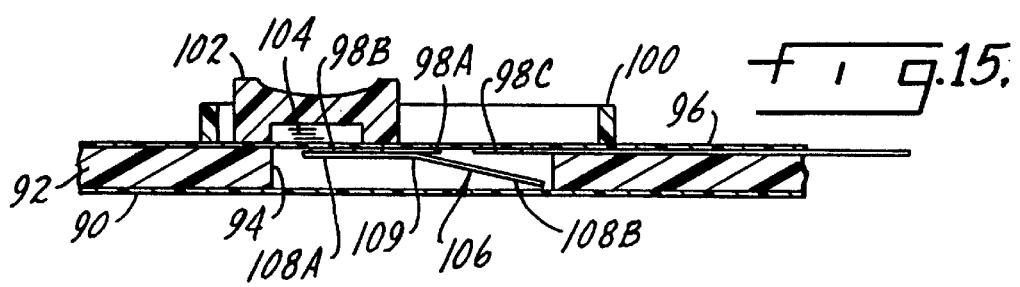
FIG. 15 is a section taken along line 15—15 of FIG. 14.

FIGS. 14 and 15 illustrate a further variant of a slide switch 88. It has a substrate 90, a spacer 92 with an opening 94, and a carrier in the form of a membrane 96, all similar to the rotary switch 38. The opening 94 is an elongated rectangle. The internal surface of the carrier or membrane 96 has electrodes or traces 98A, 98B and 98C formed thereon. Electrode 98A is a common electrode while the ends of 98B and 98C are spaced apart as shown. It will be understood that this electrode arrangement is for purposes of illustration only and many variations are possible.

A plastic housing 100 is mounted on the external surface of the membrane. The housing is generally a rectangular box with an elongated slot in the top which receives an actuator or knob 102. The actuator carries a coupler 104 which, in a preferred embodiment, is a magnet. An armature 106 is disposed in the opening 94. The armature is an angled piece of magnetic material having faces 108A, 108B joined at a vertex 109. The vertex is always in contact with trace 98A. Operation of the switch is similar to that of the FIG. 4 switch except the armature flips about its vertex rather than sliding. The actuator carries the coupler 104 back and forth. Magnetic attraction between the coupler and armature faces 108 causes the armature to flip back and forth, connecting either trace 98B or 98C to trace 98A.

The advantage of this armature 106 is the absence of friction between the armature and the switch contacts. This type of armature would be used in ultra-long life applications. The flipper armature concept could be extended to an armature with more than two faces and thus more than two stable positions to yield a multiple position switch. One example of this would be an inverted triangular pyramid or indeed a pyramid with any number of facets on its surface. Another extension would be to gang multiple flippers perpendicular to the direction of travel of the actuator. In this case multiple magnets would probably be required depending on the desired switch output.

FIGS. 11 and 12 illustrate the pushbutton switch 62 according to the present invention. Starting from the bottom up, the switch 62 includes a substrate 64, a spacer 66 with an opening 68 therein, a layer 70 of a sheet magnet and a membrane 72. Alternately, the membrane could be deleted, although it is preferred to have a membrane to seal against dust, dirt and liquids as well as to provide a surface for graphics to be printed. The membrane is normally embossed as at 74 to provide space for the actuating button 76 formed on armature 78. This space could also be made by placing a second spacer in between the top surface of magnetic layer 70 and the underside of the membrane 72.

The armature 78 is located primarily within spacer opening 68. Its actuating button 76 protrudes through an aperture 80 in the magnetic layer 70. The lower surface of the armature has a fulcrum. In this case the fulcrum takes the form of a pair of extensions 82. The extensions are shown spaced from the electrode 84A but they could be in contact even when the switch is open. The armature is made of electrically conductive and magnetic material. The magnetic layer 70 holds the armature 78 up against the underside of the layer. Electrodes 84A, 84B are formed on the internal surface of the substrate.

To actuate the pushbutton switch 62 the user will press the actuating button 76. When the user does so pre-travel is achieved when the membrane is first deformed. As the membrane is further deformed the armature abruptly breaks away from the magnetic sheet material thus providing a very crisp tactile sensation. The fulcrum extensions 82 will snap loose from magnetic layer 70 and engage electrode 84A. Thereafter the armature will pivot about the fulcrum and into contact with the electrode 84B. This shorts the electrodes and closes the switch. Upon release of the closing pressure, the magnetic attraction between layer 70 and the armature 78 will return the armature to the position of FIG. 12, thereby reopening the switch. Since the button 78 extends through aperture 80, the magnetic layer 70 moves very little, if at all during closure.

Improved tactile feel can be achieved by placing a ferromagnetic material on the top surface of the magnet sheet layer 70. This material has the effect of directing the magnetic field downwardly toward the armature. This material further enhances the tactile sensation by providing rigidity to the magnetic sheet material. One example of such a material would be a thin soft steel sheet.

The pushbutton switch as shown and described can be afforded a custom tactile feel by changing the position and size of the actuating button. Increased switch travel and/or overtravel can be achieved by adjusting the geometry and size of the armature. Ultra-short switch travel can be achieved by adjusting the position of the actuating button. Stand-alone, individual, discrete switches can be fabricated. The magnetic return force allows switches to be held in the actuated position for extended periods without becoming permanently actuated. Backlighting can be achieved by providing a hole in the armature. High temperature manufacturing processes including wave soldering can be used with high temperature materials. A printed circuit board could be used as a substrate. If an extra set of electrical contacts were located under the magnetic layer 70 (either on the layer 70 or on a membrane under the layer 70) a normally-closed switch could be incorporated in the switch of FIGS. 11 and 12.

Figure 16:
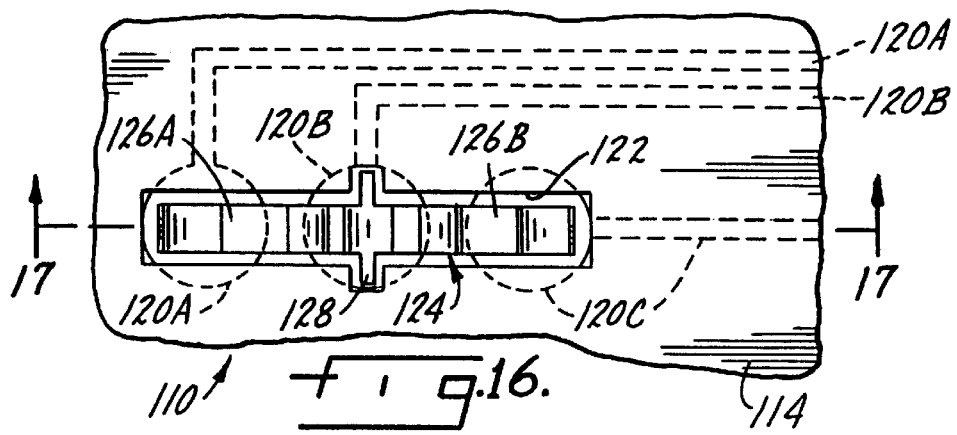
FIG. 16 is a plan view of an alternate pushbutton switch.
Figure 17:
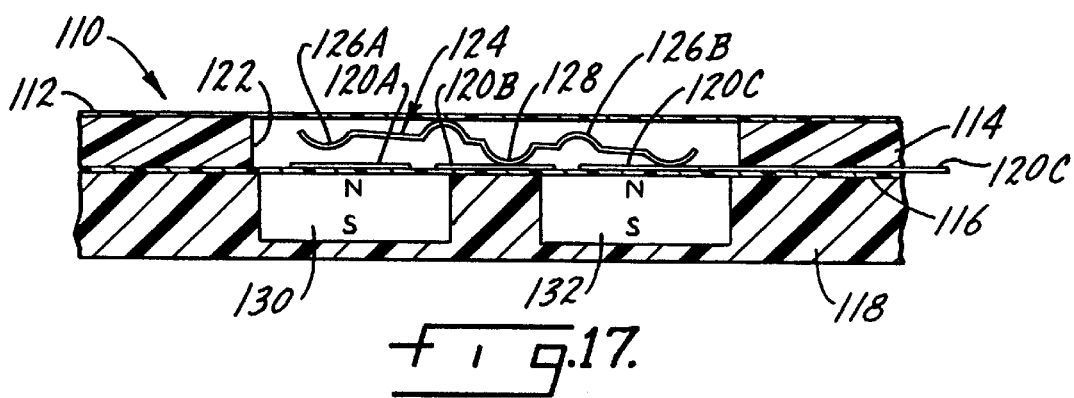
FIG. 17 is a section taken along line 17—17 of FIG. 16.

An alternate form of pushbutton switch is shown at 110 in FIGS. 16 and 17. This is a bi-stable rocker switch. The switch 110 has a membrane 112 disposed on top of a spacer 114. A substrate 116 lies on the side of the spacer opposite the membrane. A plastic backing plate 118 is situated beneath the substrate 116. The internal surface of the substrate 116 has electrodes or traces 120A, 120B and 120C formed thereon which terminate at circular pads as shown in FIG. 16. Electrode 120B is a common electrode. An opening 122 in the spacer 114 receives a rocking armature 124. The armature 124 is made of magnetic material and has a pair of arms 126A, 126B extending in opposite directions from a central fulcrum 128. The armature pivots or rocks in the spacer opening 122 about the fulcrum 128 in seesaw fashion. The fulcrum rests on the pad of common electrode 120B. The arms 126A, 126B extend toward the pads of electrodes 120A and 120C. The arm 126B is shown in FIG. 17 in the actuated position wherein the arm is in contact with electrode 120C. A pair of magnets 130, 132 are embedded in the backing plate 118 beneath the substrate. The magnets retain the armature in an actuated position and provide a tactile sensation when the switch is operated. For example, in FIG. 17 when the left side of the membrane is depressed by a user, the arm 126B of armature 124 breaks contact with electrode 120C and opens the right switch. Then arm 126A makes contact with electrode 120A, closing the left switch formed by electrodes 120A and 120B.

The pushbutton switch of FIGS. 16 and 17 can also be tri-stable or multi-stable depending on the shape of the armature and the switch contact configuration. In a tri-stable configuration and beyond, the armature would take the shape of an inverted pyramid. A further alternate embodiment of this switch would involve deletion of one of the magnets 130 or 132. Such a switch could be termed monostable because the armature would always be in contact with the electrode above the remaining magnet except when a user is depressing another part of the membrane. When that pressure is released, the magnet would cause the armature to revert to its closed position. Thus, the switch would be normally-closed.

FIG. 18 illustrates a rotary switch 134 having a pre-load mechanism. In this switch the coupler magnet is used to create a drag or pre-load on the actuating knob. This type of arrangement would be used in an application where the switch (or potentiometer) is subjected to shock and/or vibration in use. The switch 134 includes a backing plate 136 and a membrane layer 138. Although not shown, the underside of the membrane carries a set of electrodes which define the electrical switch or potentiometer. A metallic armature 140 is situated in an opening 142 in the backing plate 136. Located just above the membrane 138 is an actuator plate 144 which rotates with shaft 146 when a user turns an actuating knob 148. The shaft 146 is mounted for rotation in a plastic housing 150. A lock nut 151 retains the shaft in place. The lock nut also fastens a dial 153 which may be optionally placed on top of the housing 150. A ferromagnetic pre-load plate 152 rests between the underside of the housing 150 and the actuator plate 144. The plate 144 carries a coupler 154, which is a magnet similar to the coupler 30. The coupler not only moves the armature 140 to make and break the switch but also engages the pre-load plate 152. As the actuator plate rotates the friction between the pre-load plate and the coupler provides increased rotational torque. This arrangement could also be incorporated in a slide switch of the type shown in FIGS. 4 and 5.

FIG. 19 illustrates an alternate detent mechanism that could be incorporated in either a slide switch or a rotary switch. The particular embodiment shown is a slide switch. A floating detent plate 156 has a series of depressions or valleys 158 along one edge. The detent plate is constrained from longitudinal motion but is able to flex laterally to allow passage of a protrusion or bump 160 on the side edge of the actuator 162. The switch-actuating magnet 164 in the actuator provides the attractive force between the armature and actuator and between the detent plate 156 and the actuator. As the bump 160 slides into and out of the valleys 158 a distinct snap action is created which the user can easily feel, thereby indicating the making or breaking of the switch contacts.

Figure 20:
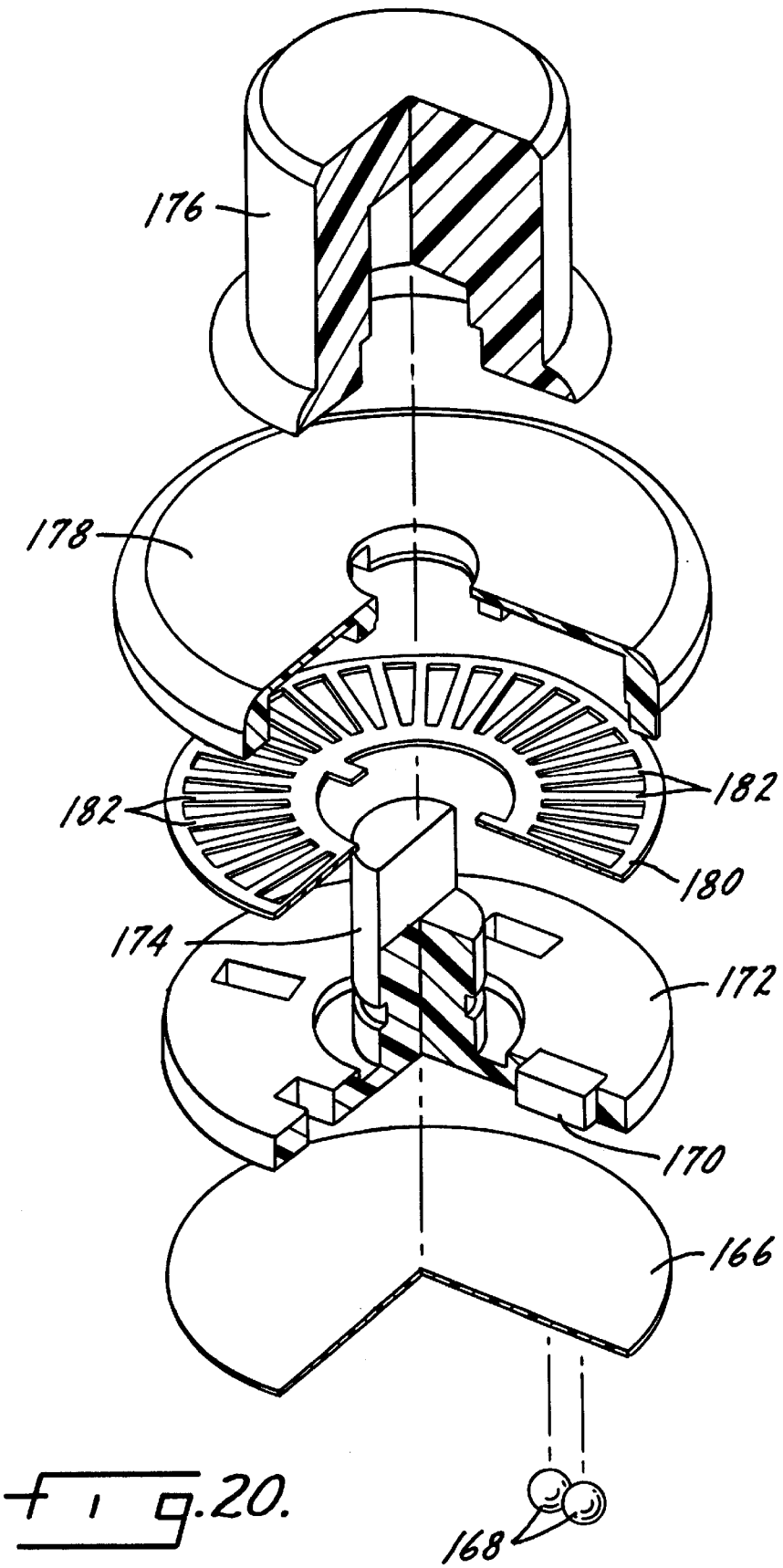
FIG. 20 is an exploded perspective view, with portions cut away, of a rotary switch having an alternate detent mechanism.

FIG. 20 illustrates a further alternate detent mechanism that could be incorporated in either a slide switch or a rotary switch. The particular embodiment shown is a rotary switch. The switch includes a carrier in the form of a membrane layer 166. Although not shown, it will be understood that the underside of the carrier has a set of electrodes which define the spaced contacts of at least one electrical switch or potentiometer. A twin-ball armature 168 rides on the underside of the carrier 166. The armature moves with a coupler magnet 170 which is mounted in a rotor 172. The rotor has an upstanding post 174 on which a knob 176 is mounted for manipulating the rotor. The rotor is mounted for rotation on the carrier 166 by a bracket 178. Located just above the rotor is a detent plate 180. The plate is made of magnetic material and has a series of ribs 182. Each rib defines a detent position as it aligns with the coupler magnet 170. The plate 180 is held fixed by the bracket 178. As the knob rotates the coupler into alignment with a rib the magnetic attraction between the coupler and rib creates a tactile sensation to the user. The ribs can be located in any position. The detent shown is designed for a 32-position quadrature output rotary switch.

Figure 21:
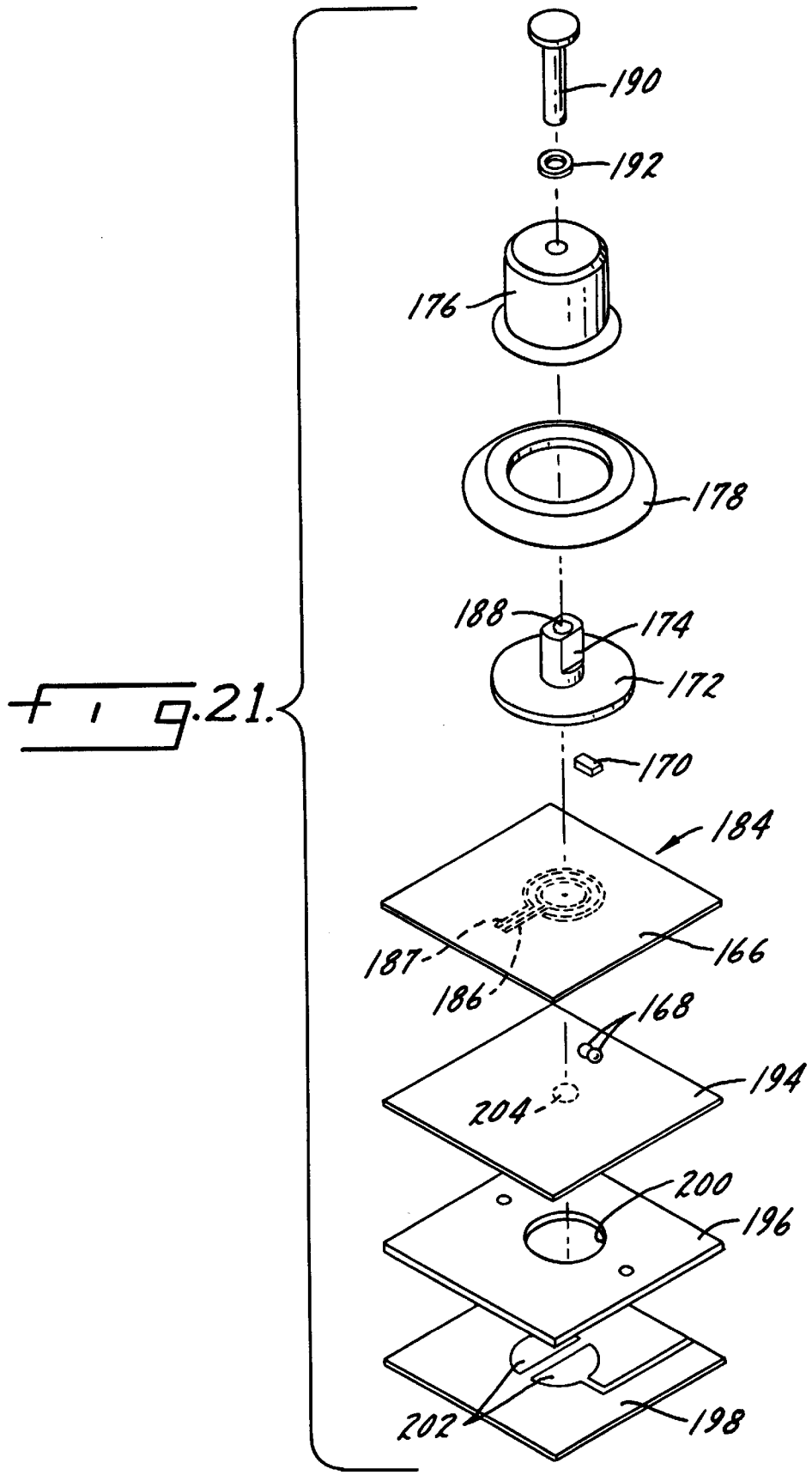
FIG. 21 is an exploded perspective view of a pushbutton rotary switch.

A pushbutton rotary switch or potentiometer, as seen in FIG. 21, is applicable to situations where a user would like to change ranges or expand the scale in some manner as the user is turning or sliding a knob. This is normally done by pushing either the knob or pushing a button located on the top surface of the knob. FIG. 21 shows how this concept can be applied in the present invention. The pushbutton rotary potentiometer 184 has several parts in common with the switch of FIG. 20, including carrier layer 166, twin-ball armature 168, coupler magnet 170, rotor 172 with post 174, knob 176 and mounting bracket 178. The underside of the carrier 166 has a set of electrodes or contacts which define the spaced contacts of at least one electrical switch or, as shown here, a potentiometer. There is a common contact 186 and a surrounding resistive element 187. The armature 168 engages the electrodes on the underside of the carrier 166, moving with the coupler magnet 170 as it turns with the rotor 172. The post 174 and knob 176 have a central bore 188 through which a pushbutton 190 extends. The pushbutton is retained by a spring washer 192. The pushbutton 190 bottoms on the carrier 166. Beneath the carrier is a membrane switch comprising a flexible membrane 194, a spacer 196, and a substrate 198. The spacer has an opening 200. Spaced apart electrodes or contacts 202 are formed on the upper side of the substrate. A shorting contact or pad 204 is formed on the underside of the membrane 194. When a user depresses the pushbutton 190 it pushes the membrane 194 down through the spacer opening 200 to a point where pad 204 engages contacts 202, thus closing the pushbutton switch.

Alternate constructions of the pushbutton rotary switch include locating an actuating pin on the base of the rotor. In this case the entire knob 176 is depressed to push the membrane 194 through the spacer 196 and close the contacts 202. It may also be possible to locate the membrane switch on the same side of the carrier as the rotor and knob. A further alternative form of the switch permits deletion of the membrane layer 194. Instead the carrier layer 166 is made of flexible material and contacts are arranged on its lower surface that form both the rotary switch and a shorting contact for the pushbutton switch.

Turning now to another aspect of the present invention, there may be some applications which may raise concern about the possibility of the switch armature being displaced from the coupler magnet. In other words, the concern is with the switch becoming inoperative if a severe mechanical impulse dislodged the armature from its normal association with the magnet. While the high magnetic attractive forces between the coupler and armature make such displacement extremely unlikely, except perhaps in cases of deliberate abuse, the switches shown in FIGS. 22–24 address this concern.

Figure 22:
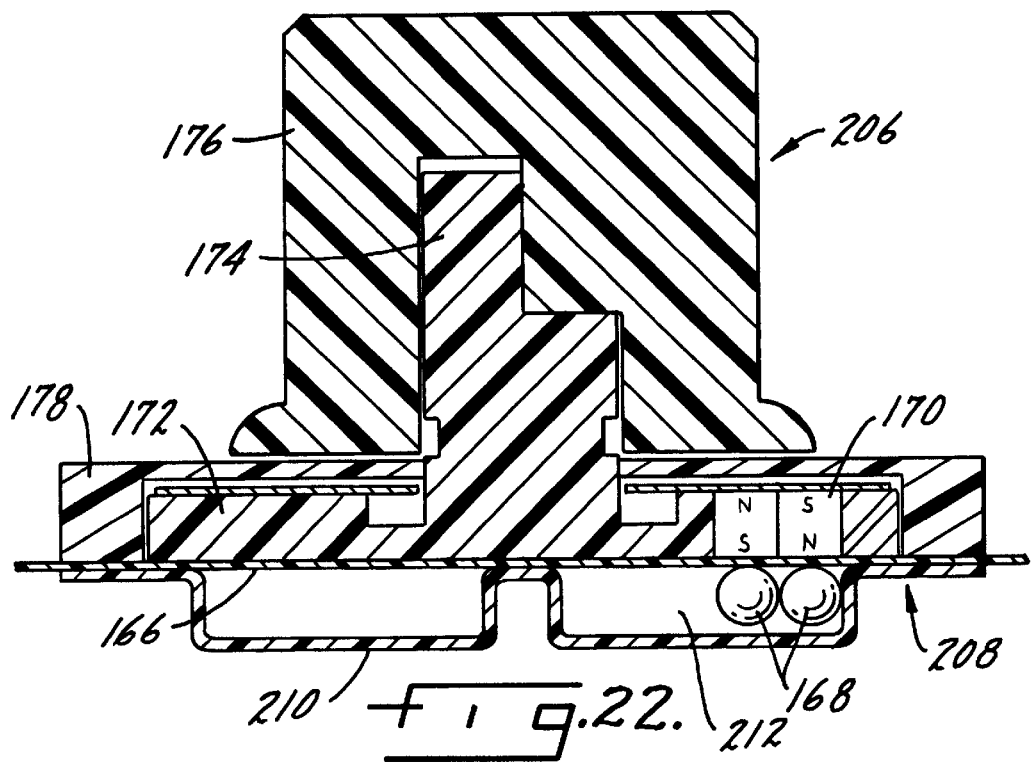
FIG. 22 is a section through a rotary switch which includes a blister pack for retaining the armature.

The rotary switch 206 of FIG. 22 is similar to the switch of FIG. 20, including a carrier layer 166, a twin-ball armature 168, a coupler magnet 170, a rotor 172 with post 174, a knob 176 and a mounting bracket 178. Once again the underside of the carrier 166 has a set of electrodes or contacts which define the spaced contacts of at least one electrical switch or potentiometer. The armature 168 engages these electrodes, moving with the coupler magnet 170 as it turns with the rotor 172. The armature is protected by a dome member, in this case a blister pack backer plate 208. Plate 208 is a film layer adhesively or otherwise secured to the underside of the carrier 166. Wherever a switch is located, a blister 210 is formed by embossing the film to provide a chamber 212 within which the armature 168 can float. Should the armature somehow become displaced, it is contained within the blister chamber 212 and thus the armature remains in the immediate vicinity of the magnets located in the rotor 172. The armature will be returned to its seated position either spontaneously after the dislodging force is removed, or when the rotor is again moved over the loose armature located inside the blister.

Figure 23:
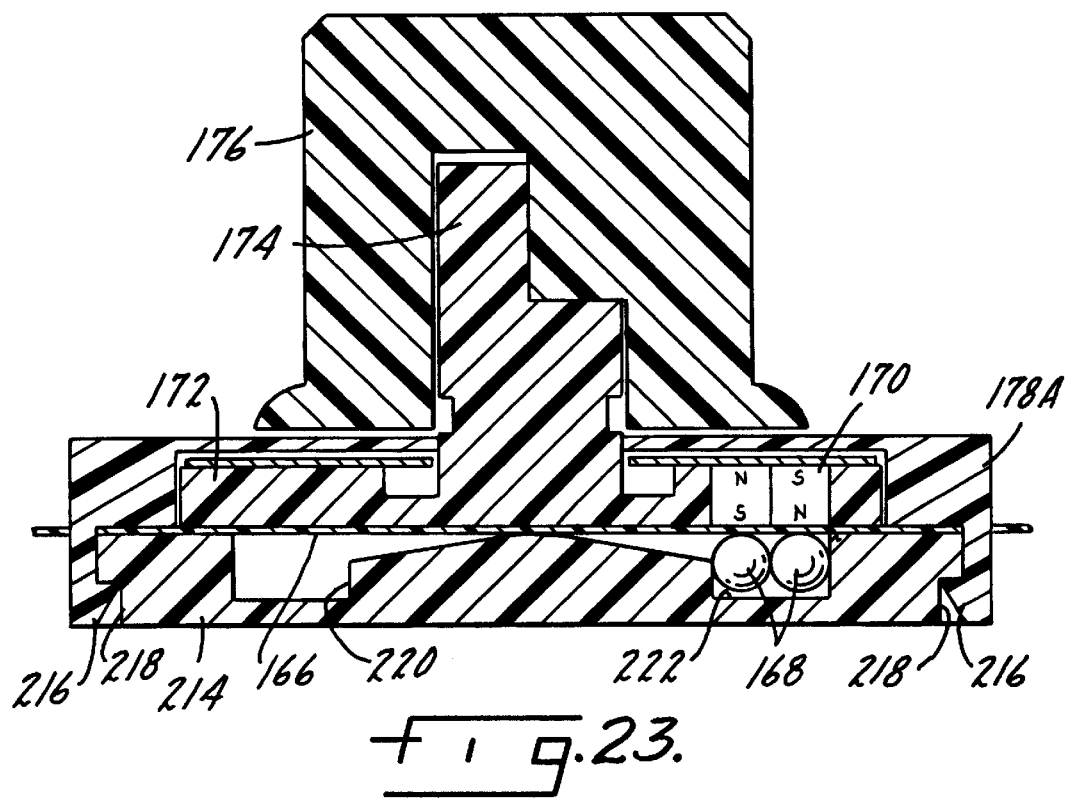
FIG. 23 is a view similar to FIG. 22 showing an alternate blister pack.
Figure 24:
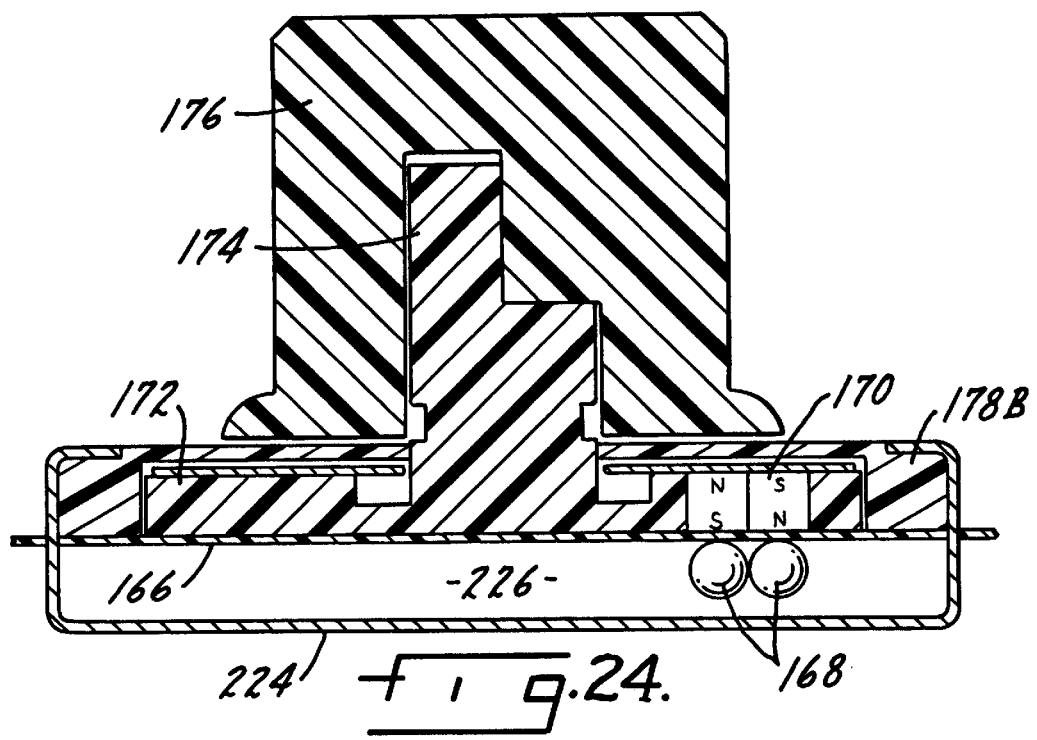
FIG. 24 is similar to FIGS. 22 and 23, showing a further alternate blister pack.

An alternate dome member is shown in FIG. 23. In this embodiment a back cover 214 is molded as an individual plastic part. Hooks 216 are provided on the bracket 178A to mate with slots 218 in the cover 214 so the two parts snap together. Holes in the carrier may be needed to allow the hooks to pass through. The cover 214 has a central boss 220 which defines a circular raceway or track 222 in which the balls 168 move. A further alternate dome member is shown in FIG. 24. In this embodiment a back cover 224 defines a chamber 226 for retaining the armature. Either one or both of the bracket 178B and the back cover 224 could be made of a ferro-magnetic metal to provide magnetic shielding to the outside world, as well as to take advantage of the economics of using a stamped metal part.

Figure 25:
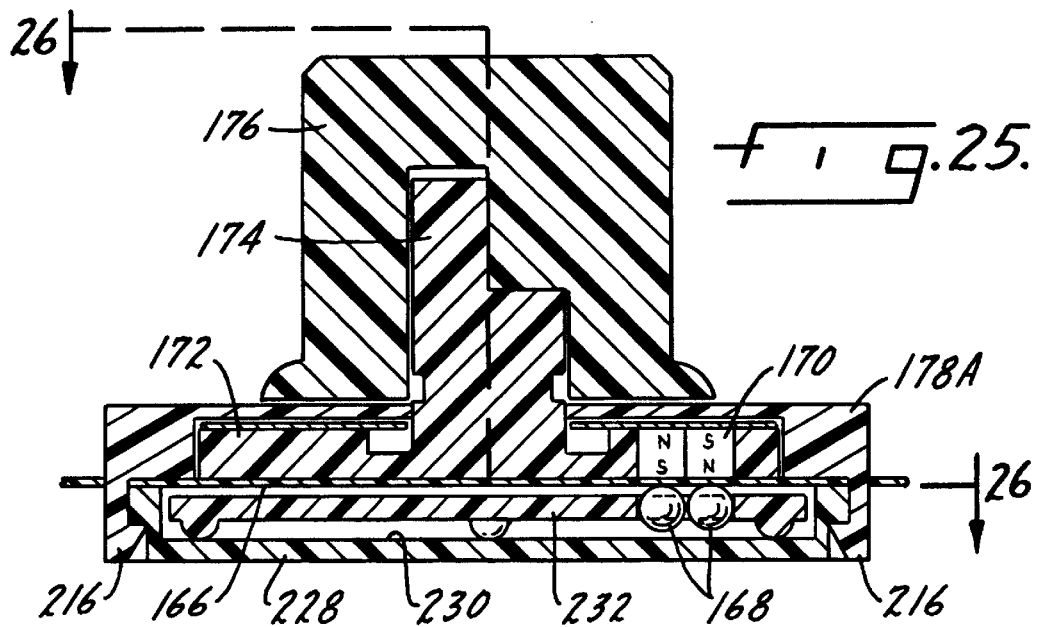
FIG. 25 is a section through a rotary switch equipped with an armature retainer.
Figure 26:
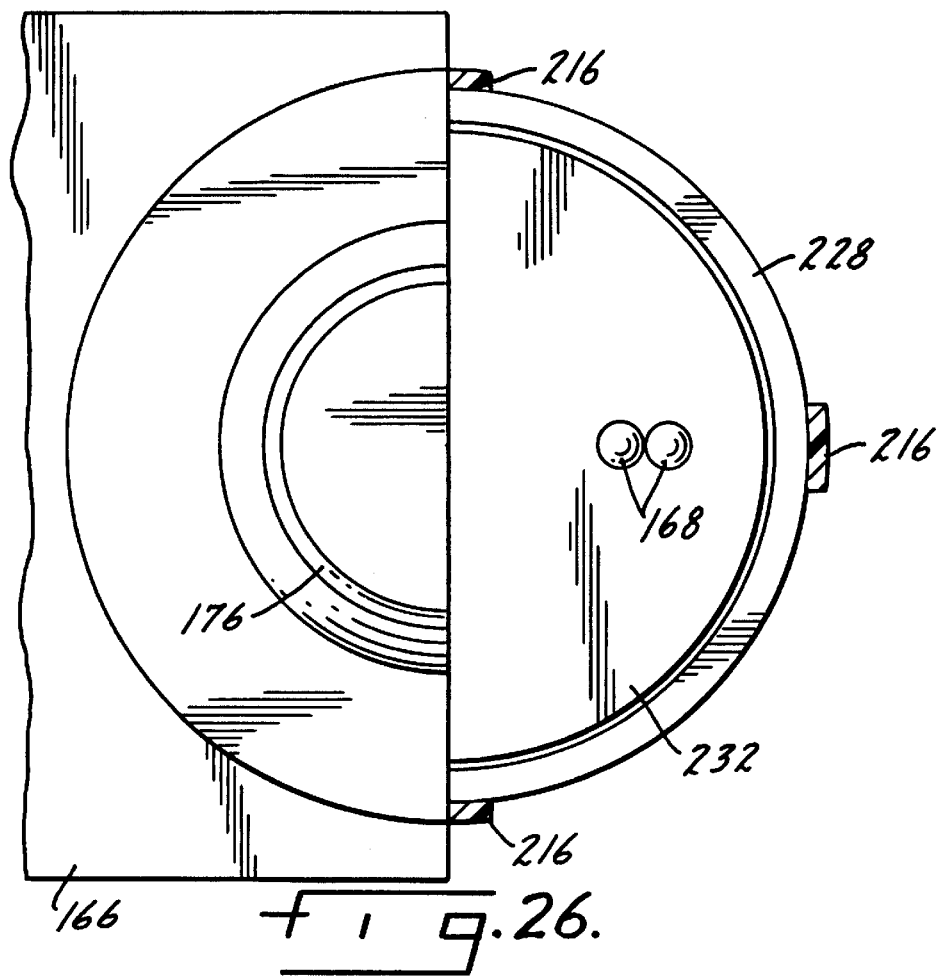
FIG. 26 is a bottom plan view of the switch of FIG. 25, with portions cut away to reveal the armature retainer.

A variation of the dome armature protectors is shown in FIGS. 25 and 26. This version has a mounting bracket similar to bracket 178A in that it has hooks 216 for holding a cover 228. Cover 228 defines an open chamber 230 between it and the carrier 166. A ball retainer 232 fits in the chamber. The balls 168 are held in position by the retainer. Even if a mechanical impulse causes the balls to break contact, they are immediately reseated after the impulse is removed. The ball retainer is designed to move with the balls during either rotary motion or sliding motion. It might also be possible to use the retainer 232 without the cover 228 if the edges of the retainer were slotted into the hooks to hold it in position.

Figure 27:
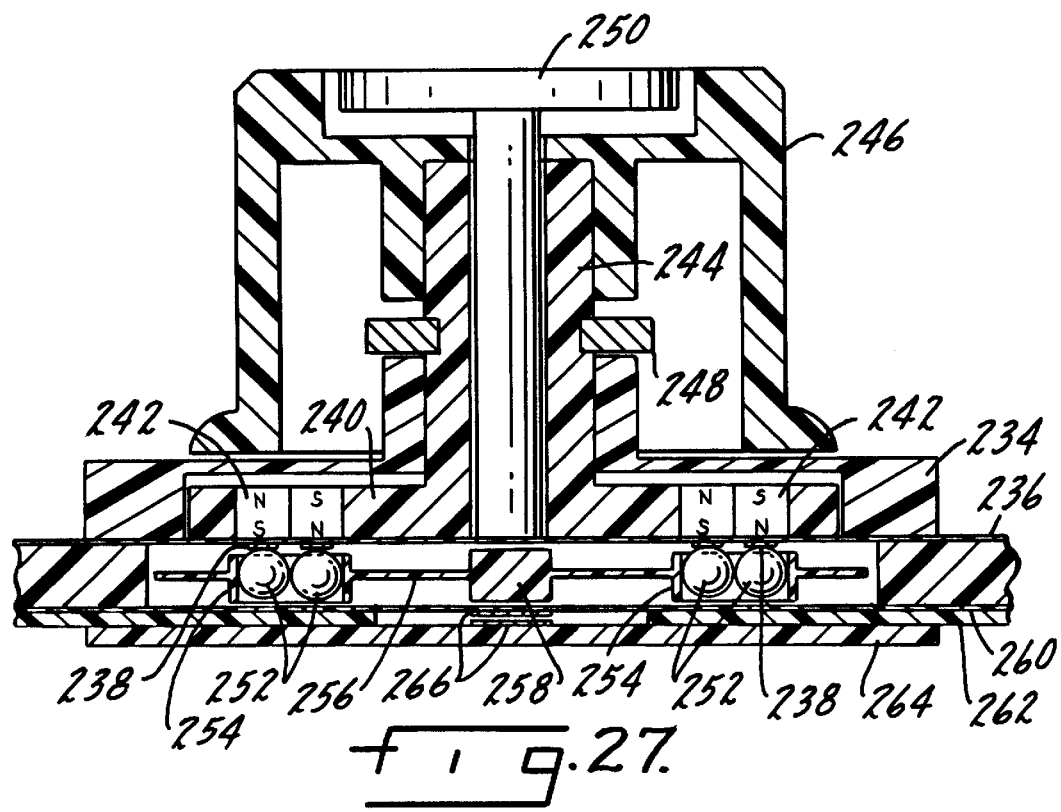
FIG. 27 is a section through a pushbutton rotary switch equipped with an armature retainer.

FIG. 27 shows an alternate arrangement of a retainer incorporated in a pushbutton rotary switch. This switch has a cover 234 attached to a flexible carrier layer 236. The underside of the carrier has silver contacts 238. A rotor 240 has two couplers in the form of magnet pairs 242. The rotor also has a hollow central post 244. The rotor is attached to a knob 246 by an E-ring 248. A plunger 250 can move up and down in the bore of the post 244. The plunger is shown resting on top of the carrier 236. Alternately there may be an opening in the carrier allowing the plunger to extend through into contact with a retainer hub 258.

Two twin-ball armatures 252 are fixed in receptacles 254 of a ball retainer. The retainer includes a web 256 joining the receptacles to a central hub 258. The hub is aligned with the plunger 250 and directly above the contacts of a membrane switch. The membrane switch includes a membrane 260, spacer 262 and substrate 264, with facing contacts 266 on the inside surfaces of the membrane and substrate. Pressure on the top of the plunger 250 is transferred by the hub 258 to the membrane, pushing it through an opening in the spacer to bring contacts 264 into engagement. The hub may alternately include a small button or nodule on its underside to further concentrate the actuating force.

FIG. 28 shows a V-channel ball armature device. As with the other devices shown herein this could be either a switch or potentiometer, depending on the arrangement of the electrodes. The device includes a carrier block 268 having a V-shaped channel 270 or groove in one surface. There are electrodes 272 formed on the sloped sides of the channel. A single ball armature 274 rides in the channel. A coupler 276 is movable on the carrier block side opposite the channel for the purpose of moving the ball 274 back and forth in the channel. This arrangement permits a single ball armature. The channel could have a devious path with corners or curves to define a complex actuating pattern, e.g., the shifting pattern of a five-speed transmission.

While a preferred form of the invention has been shown and described, it will be realized that alterations and modifications may be made thereto without departing from the scope of the following claims. For example, the positions of the magnet and armature could be reversed, i.e., the armature could be the magnet and the knob would carry a piece of magnetic material that would cause the magnet to follow the moving knob. Multiple carrier layers could be incorporated into a stackable switch actuated by a common knob. More than one coupler magnet could be provided to slide two or more armatures in association with one carrier.

I claim:

1. An electrical switch, comprising:

a carrier having first and second surfaces;

a set of electrodes disposed on one of said carrier surfaces and defining at least one pair of spaced switch contacts;

an actuator for selectively opening or closing the switch contacts, the actuator comprising an electrically conductive armature disposed on said one of the carrier surfaces, and a coupler movably mounted on the other of the carrier surfaces, the coupler being a permanent magnet and the armature being made of magnetic material such that the armature is normally held in engagement with said one surface of the carrier by the magnetic attraction between the coupler and armature, movement of the coupler causing corresponding movement of the armature into and out of shorting relation with the switch contacts; and a detent plate adjacent the coupler, the detent plate being made of magnetic material and having a plurality of spaced ribs spanning the path of movement of the coupler, the magnetic attraction between the coupler and ribs providing a tactile sensation that defines a switch position.

2. The switch of claim 1 wherein the detent plate is generally circular and the ribs are arranged radially thereon.

3. An electrical switch, comprising:

a flexible member having first and second surfaces;

a first set of electrodes disposed on one of said flexible member surfaces and defining at least one first pair of spaced switch contacts;

an actuator for selectively opening or closing the switch contacts, the actuator comprising an electrically conductive armature disposed on said one of the flexible member surfaces, and a coupler movably mounted on the other of the flexible member surfaces, the coupler being a permanent magnet and the armature being made of magnetic material such that the armature is normally held in engagement with said one surface of the flexible member by the magnetic attraction between the coupler and armature, movement of the coupler causing corresponding movement of the armature into and out of shorting relation with the switch contacts;

a spacer adjacent said one surface of the flexible member with an opening defined in the spacer;

a substrate adjacent said spacer;

a second set of electrodes disposed on one of either the flexible member or the substrate and defining at least one second pair of spaced switch contacts; and a shorting pad disposed on the other of either the flexible member or the substrate in facing relation with the second set of electrodes such that deflection of the flexible member causes contact between the second set of electrodes and the shorting pad, thereby closing the switch defined by said electrodes.

4. The switch of claim 3 wherein the flexible member comprises a carrier layer.

5. The switch of claim 3 wherein the flexible member comprises a carrier layer and a membrane lying directly adjacent one another with the second electrodes or shorting pad formed on the membrane.

6. The switch of claim 3 wherein the actuator further comprises a knob, the knob being movably mounted on the other of the flexible member surfaces and having a coupler therein which moves with the knob, and a pushbutton extending through the knob into contact with the flexible member.

7. An electrical switch, comprising:

a carrier having first and second surfaces;

a set of electrodes disposed on one of said carrier surfaces and defining at least one pair of spaced switch contacts;

an actuator for selectively opening or closing the switch contacts, the actuator comprising an electrically conductive armature disposed on said one of the carrier surfaces, and a coupler movably mounted on the other of the carrier surfaces, the coupler being a permanent magnet and the armature being made of magnetic material such that the armature is normally held in engagement with said one surface of the carrier by the magnetic attraction between the coupler and armature, movement of the coupler causing corresponding movement of the armature into and out of shorting relation with the switch contacts; and a dome member connected to the carrier defining a chamber in which the armature resides.

8. The switch of claim 7 further comprising a bracket attached to the carrier and the dome member is affixed to the bracket.

9. The switch of claim 8 wherein the bracket further comprises hooks engageable with the dome member.

10. The switch of claim 7 further comprising an armature retainer rotatable with the armature in the chamber.

11. An electrical switch, comprising:

a carrier having first and second surfaces;

a set of electrodes disposed on one of said carrier surfaces and defining at least one pair of spaced switch contacts;

an actuator for selectively opening or closing the switch contacts, the actuator comprising an electrically conductive armature disposed on said one of the carrier surfaces, and a coupler movably mounted on the other of the carrier surfaces, the coupler being a permanent magnet and the armature being made of magnetic material such that the armature is normally held in engagement with said one surface of the carrier by the magnetic attraction between the coupler and armature, movement of the coupler causing corresponding movement of the armature into and out of shorting relation with the switch contacts; and an armature retainer engageable with the armature and movable therewith.

12. The switch of claim 11 wherein the armature retainer comprising a generally flat disk having openings therein for receiving the armature.

13. An electrical switch, comprising:

a carrier block having first and second surfaces and a groove formed in the first surface;

a set of spaced electrodes disposed in said groove;

an actuator comprising an electrically conductive armature disposed in said groove, and a coupler movably mounted on the second carrier block surface, the coupler being a permanent magnet and the armature being made of magnetic material such that the armature is normally held in engagement with said groove by the magnetic attraction between the coupler and armature, movement of the coupler causing corresponding movement of the armature with respect to the electrodes.

14. The switch of claim 13 wherein the groove is generally V-shaped.

15. A potentiometer, comprising:

a carrier having first and second surfaces;

a set of electrodes disposed on one of said carrier surfaces and defining at least one resistive element and an associated common contact spaced from the resistive element; and an actuator for selectively operating the potentiometer, the actuator comprising an electrically conductive armature disposed on said one of the carrier surfaces, normally in contact with both the common contact and resistive element, and a coupler movably mounted on the other of the carrier surfaces, the coupler being a permanent magnet and the armature being made of magnetic material such that the armature is normally held in engagement with said one surface of the carrier by the magnetic attraction between the coupler and armature, movement of the coupler causing corresponding movement of the armature along the resistive element and in engagement with the common contact.

16. The structure of claim 15 wherein the actuator further comprises a knob mounted for movement adjacent the other of said carrier surfaces, the coupler being connected to the knob for movement therewith adjacent said other surface of the carrier.

* * * * *